A. C. Kasson,
Wood Auger.
N° 61,208. Patented Jan. 15, 1867.

Witnesses:
L. A. Jackson
Theo Tusch

Inventor:
A. C. Kasson
Per Munn & Co
Attorneys

United States Patent Office.

A. C. KASSON, OF MILWAUKEE, WISCONSIN.

Letters Patent No. 61,208, dated January 15, 1867.

---

IMPROVEMENT IN AUGERS.

---

The Schedule referred to in these Letters Patent and making part of the same.

---

TO ALL WHOM IT MAY CONCERN:

Be it known that I, A. C. KASSON, of Milwaukee, in the county of Milwaukee, and State of Wisconsin, have invented a new and useful Improvement in Augers; and I do hereby declare that the following is a full, clear, and exact description thereof.

My invention consists in forming the twist of an auger or auger-bit, so that while half circles shall be formed by the twist for the discharge of the shavings, by turning the edge of the twist inward, the cutting-lip of the auger shall receive its shape from the form of the twist, and the outer edge of the twisting shall be a cuttin-gedge its whole length.

And to enable others skilled in the art to make and use my invention, I will proceed to describe its construction and operation, reference being had to the accompanying drawings, forming a part of this specification, and to the letters of reference marked thereon.

Similar letters of reference indicate like parts.

Figure 1:
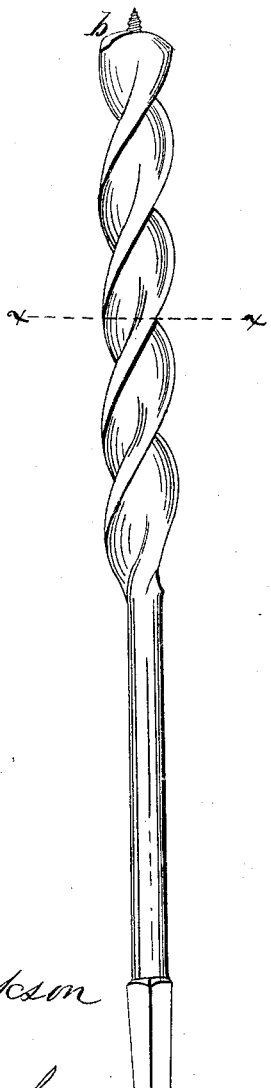
Figure 1 represents the auger as constructed for use.
Figure 2:
Figure 2 is a cross-section through the line $x\,x$ of fig. 1.

The twist of the auger is represented in fig. 2. It will be noticed that the edges of the twist $a\,a$ are turned inward, forming a curve or half circle, which receives the chips or shavings, and from which they are discharged without being impeded by friction against the sides of the hole, thus relieving the auger and preventing its clogging in the hole, and greatly lessening the labor. This outer edge of the twist is itself a cutting-edge its whole length, and the hole is consequently made smooth and true. Thus a cutter is formed by the twist which throws the shavings or chips into the half circle or concave twist, without any extra or special lip or curve of the lip of the cutter. The form of the curve from the outer edge of the twist to the centre or near the centre, gives shape and form to the cutting-lip $b$ of the auger. The lip $b$ has a gouge shape or the half circle shape of the twist, and as the twist has the same shape its whole length, it will be seen that any portion of the twist will form the cutting-lip as well as the lower portion, and consequently should the lip or the screw be broken, another lip and another screw can be formed and the auger be rendered as efficient as ever, instead of being rendered entirely useless as would be the case with common augers. Spurs may be attached to the lip if deemed advisable. The cutting-lip commences at the screw and is in fact nothing more than the lower end or termination of the twist brought to an edge, the cutting-edge of the auger extending from the screw to the top of the twist. This form of twist makes a much stronger and stiffer auger than the old kind; the turning in of the edge of the twist forms a convex surface on the opposite side which acts as a rib, and which greatly strengthens the auger.

Having thus described my invention, what I claim as new, and desire to secure by Letters Patent, is—

1. An auger having a twist whose front or working faces are concave and whose rear surfaces are convex, substantially as represented in fig. 2 of the drawings.

2. An auger constructed substantially as herein shown and described, which permits the formation of cutting-lips at any point in its length by simply sharpening the edges.

A. C. KASSON.

Witnesses:
 CHAS. H. RAYMER,
 M. J. McFARLAN.